United States Patent [19]

Ettema et al.

[11] 4,450,132
[45] May 22, 1984

[54] PLASTIC CRATE OR TRAY WITH SLIDE WALL INJECTION MOLDING POINTS

[75] Inventors: Ernst Ettema, Hardenberg; Coenraad J. B. M. Benraad, Dedemsvaart; Klaas Roskam, Hardenberg, all of Netherlands

[73] Assignee: Wavin B.V., Zwolle, Netherlands

[21] Appl. No.: 379,972

[22] Filed: May 19, 1982

Related U.S. Application Data

[63] Continuation of Ser. No. 147,183, May 7, 1980, abandoned.

[30] Foreign Application Priority Data

May 11, 1979 [NL] Netherlands .......................... 7903735

[51] Int. Cl.³ .............................................. B29F 1/04
[52] U.S. Cl. ............................. 264/328.8; 264/328.12
[58] Field of Search ......................... 264/328.8, 328.12

[56] References Cited

U.S. PATENT DOCUMENTS

| | | | |
|---|---|---|---|
| 2,840,856 | 7/1958 | Moxness | 264/328.8 X |
| 3,626,051 | 12/1971 | Liautaud | 264/328.8 X |
| 3,861,841 | 1/1975 | Hanning | 264/328.8 X |
| 4,335,068 | 6/1982 | Hemery | 264/328.8 X |

FOREIGN PATENT DOCUMENTS 197712 12/1977 Canada ........................... 264/328.12

Primary Examiner—Thomas P. Pavelko
Attorney, Agent, or Firm—Wilkinson, Mawhinney & Theibault

[57] ABSTRACT

A plastic crate or tray comprises a bottom and vertical side walls. A side wall comprises inner and outer side wall parts.

Injection molding points are present in the lower edge of the outer side wall parts.

1 Claim, 6 Drawing Figures

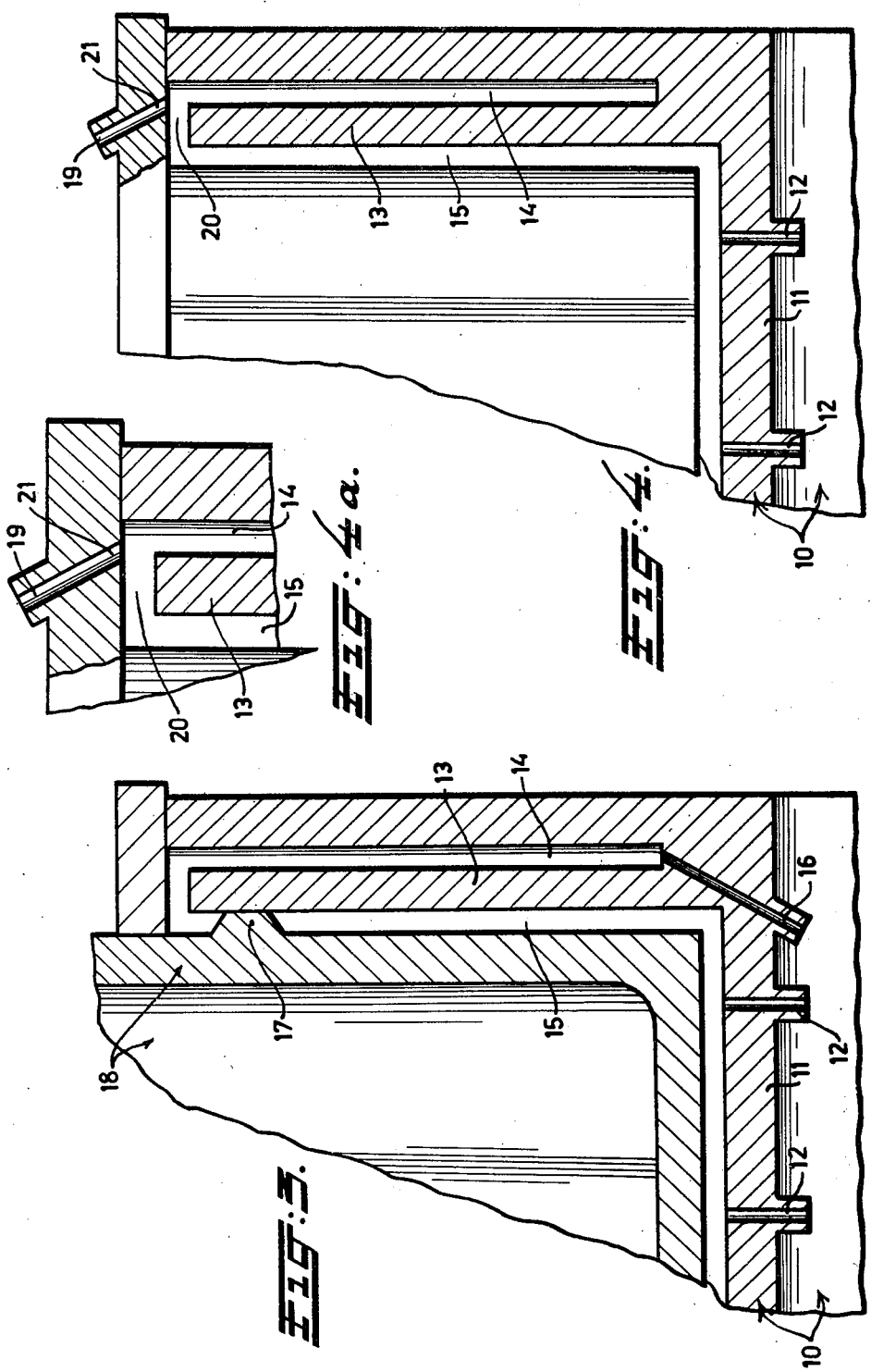

PLASTIC CRATE OR TRAY WITH SLIDE WALL INJECTION MOLDING POINTS

This application is a continuation of application Ser. No. 147,183, filed May 7, 1980, now abandoned.

BACKGROUND OF THE INVENTION

1. Field of the Invention

The present invention relates to a plastic crate or tray, comprising a bottom and vertical side walls, said side walls being at least partially doublewalled, which plastic crate or tray comprises injection molding points.

2. Description of the Prior Art

In the prior art plastic crates or trays of the above-mentioned type have been used. Said modern crates or trays comprising hollow corner columns and/or hollow side walls are also presently employed to a great extent as said plastic crates and/or trays may now be manufactured while economizing on the plastic material, while, nevertheless loading requirements are still met.

On injection-molding said plastic crates or trays comprising hollow corner columns and/or hollow side walls, problems will occur, due to the flow of injection-molded material into the hollows or openings of the relative mold.

These problems particularly involve uneven wall thicknesses in the corner columns or in the side walls, because of shifted cores, which may lead to an accelerated wear out or cleavage of the respective molds, whilst furthermore, flow lines will occur in the plastic crate or tray, which will disadvantageously influence the properties of strength of the respective crate or tray.

Actually, a plastic crate or tray is manufactured by injection-molding plastic into the lower side of the mold at the location of the bottom. Independent on the type of plastics, the type of injection molding apparatus and the preference of the relative laborer, a large central injection molding point is used, or several injection molding points being divided across the bottom.

When using a central injection molding point, the material flows through the space which will form the bottom of the plastic crate or tray toward the space which will form the side walls of the crate or tray, subsequently said material arrives in the space forming the side walls, thereby filling the space for the relative outer wall. When the core between the inner wall and the outer wall is higher, said core will be pressed outwardly, involving all the drawbacks mentioned hereinbefore.

Though several injection molding points may be used which are divided across the bottom, the hollows or openings of said points will then be filled simultaneously with the filling of the side wall mold hollows or openings.

In actual practice, however, this method of filling several spaces in a mold has been chosen, as the bottom forms the most loaded part of a crate or tray, so that said bottom should not possess any flowlines or seams and if this is the case as yet, said flowlines or seams should be sealed in a very early stage, thus avoiding any weak spots in said bottom.

Efforts have been made to obviate the shifting of the cores during the formation of the inner and outer wall of a double wall, by applying said core supports in the outer mold, which will result in gaps in the outer wall. It goes, however, without saying that said gaps are rather unattractive with a view to the properties of strength of the respective products, whilst the core supports may easily damage the relative molds in actual practice.

SUMMARY OF THE INVENTION

In view of the foregoing factors and conditions of the prior art it is a primary object of the present invention to provide a plastic crate or tray of the aforementioned type, which plastic crate or tray will now show uneven wall thicknesses or any undesired flow line(s).

This object is attained in accordance with the present invention in that the crate or tray at least includes an injection molding point in a side wall.

A molding point in a side wall is here to be understood as a molding point in a side wall such, that the cores bounding the innermost and outermost side wall parts of the vertical walls, will be flown around by plastics from the outside toward the inside, during an injection-molding process.

In a preferred embodiment of the present invention said molding points will therefore be accommodated in an outermost side wall part, but it will be obvious that when important connections are to be ensured between the spaces forming the innermost and outermost side wall parts, the plastic still has the opportunity to overflow the cores from the outside toward the inside.

During the injection molding process, a force is exerted upon the cores of the hollow side wall or corner column by the plastic mass flowing into the mold.

Due to the use of injection molding points in an outer wall of a plastic crate or tray, the long cores which bound the space which will form the inner wall and outer wall of a vertical side wall of a crate or tray, will simultaneously be flown around by plastics from the outside toward the inside during the injection-molding process. Obviously said cores then need not be subjected to displacements or deflections, so that the wall thickness will be equal all over the crate or tray, whilst the respective molds will only be loaded minimally, so that an optimum lifetime can be obtained.

In another preferred embodiment of the present invention the injection molding points are accommodated at distance from partitions disposed between the side wall parts.

Should, as a matter of course, the injection-molding take place at the location where said partitions have been formed, the core bounding the various spaces will not remain stationary, so that all the drawbacks mentioned hereinbefore will occur.

The molding points are conveniently disposed upon the front sides of the side wall parts, and preferably at the lower side of the outermost side wall parts.

In still another preferred embodiment of the present invention the molding points are disposed in the plane of the side wall parts or under an angle with respect to the side wall parts and more preferably in an upper edge connecting the two side wall parts.

Thus a very homogeneous flow division is obtained, so that the long cores forming the inner wall and the outer wall of a plastic crate or tray, will be flown around by plastics in an optimum manner.

A disposal of molding points at the locations as mentioned before, is not obvious, as molding experts assumed up till now, that a molding point of a plastic crate or tray should never be accommodated at the beginning of a wall part, and parallel with that wall, since the flowing plastic mass would directly flow into the relative space and would give rise to many irregularities in the wall parts to be molded. Said irregular division of plastics would give rise to a notable decrease in the properties of strength.

It has surprisingly appeared that said objection does not regard the present invention, as in accordance with said invention, plastic crates or trays, having optimum properties of strength, may be obtained, provided the core parts which bound the space for molding an inner wall part and an outer wall part of a vertical wall, are homogeneously flown around by plastics from the outside toward the inside.

In an appropriate embodiment of the present invention the molding points are substantially disposed in the extension of the outermost side wall part.

In another preferred embodiment of the present invention, the injection molding points are disposed in the lower side of the outermost side wall part, thus causing a plastic crate or tray to be obtained with very good strength properties, as on the one hand the space which will form the outermost side wall part is filled from the bottom molding points, whilst on the other hand, the cores which bound the space for molding the outermost side wall part, are simultaneously flown around by a plastic mass supplied from the lower sides of the outermost wall parts. In this case the side cores bounding the side wall parts preferably rest against the main core, which results in the inner wall part of the vertical side wall of the plastic crate or tray being provided with openings at the location where said support took place.

According to the present invention, the extensions of an innermost side wall part do not exhibit any molding points, which is very convenient in this case, as the fact has emerged that the presence of molding points at the aforementioned locations, will cause the core parts bounding the innermost and outermost wall parts of the vertical wall, to be pressed toward the outside as yet, so that the outer wall would be weakened and the relative mold would get damaged.

In case a molding point is accommodated upon an innermost side wall part, this implies that there are substantial connections between the innermost and outermost side wall parts, in order to ensure a sufficient flowing around of the cores by a plastic mass from the outside toward the inside.

The present invention is also embodied in a method of manufacturing a plastic crate or tray comprising a bottom and vertical side walls, being at least partially doublewalled, said plastic crate or tray comprising injection molding points, corresponding with molding openings in the injection-molding mold space, wherein a plastic crate or tray is molded and in which the plastic mass is injection-molded in such a manner that the cores 13, bounding the innermost and outermost side wall parts of a vertical wall are evenly flown around by plastics from the outside toward the inside, during the injection molding process.

The plastics are preferably injected into the lower edge and/or the upper edge of the outer wall of the doublewalled crate or tray.

The present invention is likewise embodied in a mold for injection-molding plastic crates or trays, which mold at least comprises side cores for molding at least partially doublewalled side walls, the mold comprising plastic supplying channels, wherein the plastic supplying channels adjoin the mold hollows such, that the plastic will evenly flow around the side cores from the outside toward the inside, during the injection-molding process.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 3 is part of an injection-molding mold, comprising molding points which debouch into an outer wall of the plastic crate or tray;

FIG. 4 is part of a mold for a plastic crate or tray, corresponding to FIG. 3, the molding points in this case being disposed in the upper edge part of the crate or tray, which upper edge interconnects the vertical side wall parts and FIG. 4a is a detail of FIG. 4.

DESCRIPTION OF A PREFERRED EMBODIMENT

Figure 1:
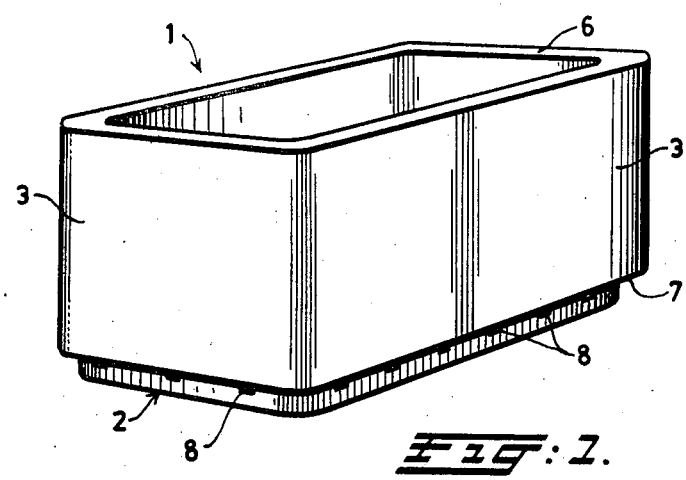
FIG. 1 is a perspective view of a plastic crate or tray in accordance with the present invention.

Initially referring to FIG. 1, a plastic crate or tray 1, comprises a bottom 2 and vertical side walls 3, which vertical side walls always face each other pairwise.

The vertical side walls 3 are doublewalled, so forming an innermost side wall part 4 and an outermost side wall part 5.

The innermost side wall parts 4 are connected with the bottom 2, while said innermost side wall parts 4 and the outermost side wall parts 5 are interconnected at their upper side by means of an upper edge 6 of the crate or tray. Said connection is, however, not essential.

Figure 2:
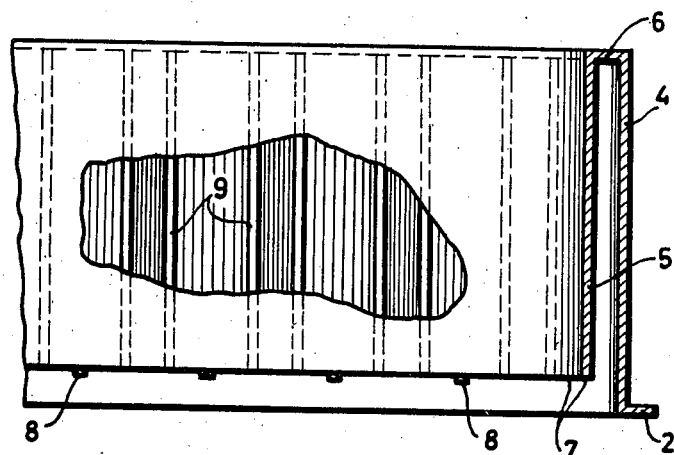
FIG. 2 is a vertical side wall of a crate or tray with a partially exploded outer wall part and several molding points which are illustrated on an enlarged scale.
Figure 2A:
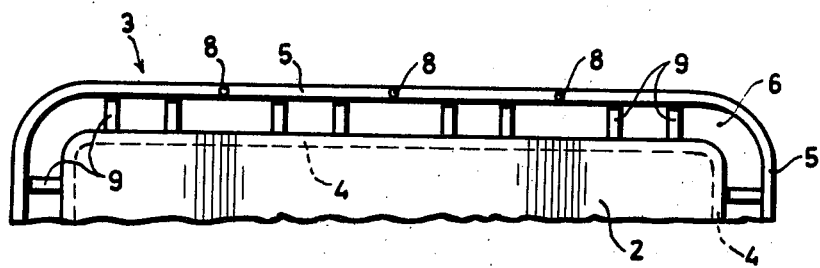
FIG. 2a is a view of the crate or tray as seen from the lower side.

Referring now to FIG. 2, the front side 7 of the outermost side wall part 5 comprises injection molding points 8. Said injection molding points 8 upon a plastic crate or tray according to the present invention, are clearly recognizable. The molding points 8 are disposed at distance from partition wall reinforcing ribs 9, which connect the innermost side wall parts 4 with the outermost side wall parts 5. In case the molding points 8 would be disposed upon said reinforcing ribs, the quality of the crates or trays obtained would be inferior.

Manufacturing a crate or tray of this type was assumed by injection molding experts to be impossible, due to the fact that the presence of such molding points would cause the injection-molded mass to be injected directly into the space of a mold, for shaping the outer wall part 5. According to present viewpoints, the latter would give rise to the formation of inferior flow lines or seams and undesired inhomogeneities in the edge. The crate or tray according to the present invention does not have the aforementioned drawbacks, since in actual practice, sooner a wall having improved properties of strength is obtained.

Very good plastic crates or trays are also obtained when the injection molding points 8 are disposed in the upper edge 6 of said crate or tray, said edge interconnecting the innermost side wall parts 4 with the outermost side wall parts 5 of a vertical side wall of a crate or tray.

In that case the molding points should, however, be accommodated in the upper edge 6 at distance from the reinforcing ribs 9 and, moreover, at distance from the extension of the innermost side wall parts 4.

Should the injection molding points 8 be disposed axially above the innermost sidewall parts 5, then the disadvantageous properties as mentioned hereinbefore would be obtained, to wit an uneven wall thickness of the innermost wall parts 4 and the outermost wall parts 5, because the cores within a mold for the innermost side wall parts 4 and outermost side wall parts 5 are pressed outwardly.

Referring now to FIG. 3, part of a mold 10, for molding a plastic crate or tray in accordance with the present invention is shown. For the sake of simpliciity the partitioning for the plastic crate or tray is not visible in this figure.

The mold 10 comprises a mold bottom 11, with a supply channel 12, which supply channel 12 debouches into the bottom at distance from the spaces which will form the inner wall 4 and the outer wall 5 of a plastic crate or tray.

Consequently, a space 14 and a space 15 for molding the innermost side wall parts 4 and the outermost side wall parts 5 are disposed at either side of the longitudinal side wall cores 13.

The mold 10 comprises a plastic supplying channel 16 which debouches into the space for molding the outer wall part 5.

An inward displacement of the longitudinal cores 13 is avoided by supporting the upper sides of said cores, by supporting pins 17, being supported in turn by an inner core 18 for molding a plastic crate or tray in accordance with the present invention.

FIG. 3 clearly shows that the channels 16 debouch at distance from the spaces where the reinforcing ribs interconnecting the innermost and outermost side wall parts 4 and 5, will be molded.

Referring now to FIG. 4, the upper side of the mold now comprises molding channels 19, which molding channels debouch into a space 20 for molding the upper edge 6 of the crate or tray.

As can be finally seen in FIG. 4a, the mouths 21 of the channels are positioned at distance from the space 15 which will form the innermost side wall part 4.

Said molding channels 19 are, in a very advantageous manner, slopingly postured, thus causing the plastic mass to be thrown against the outer wall part of space 14.

What is claimed is:

1. The method of injection molding a plastic container having a bottom and vertical side walls having portions at least double walled having an upstanding partition (13) separating said side walls comprising injecting plastic in an injection mold having an open mold space for the whole container at a first injection molding point (12) at the bottom of the mold to form the container bottom and inside portion of the side walls while simultaneously injecting plastic at a second injection molding point in the mold at the bottom to form the outer container vertical wall without deflecting said upstanding partition (13).

* * * * *